(12) United States Patent
Noguchi

(10) Patent No.: US 11,538,492 B2
(45) Date of Patent: Dec. 27, 2022

(54) INFORMATION PROCESSING APPARATUS AND METHOD OF PROCESSING INFORMATION

(71) Applicant: FUJITSU LIMITED, Kawasaki (JP)

(72) Inventor: Yasuo Noguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/568,750

(22) Filed: Jan. 5, 2022

(65) Prior Publication Data
US 2022/0319541 A1 Oct. 6, 2022

(30) Foreign Application Priority Data

Apr. 2, 2021 (JP) .............................. JP2021-063674

(51) Int. Cl.
*G11B 5/008* (2006.01)
(52) U.S. Cl.
CPC ................................ *G11B 5/00813* (2013.01)
(58) Field of Classification Search
None
See application file for complete search history.

(56) References Cited

U.S. PATENT DOCUMENTS

| | | | | |
|---|---|---|---|---|
| 4,873,589 A | * | 10/1989 | Inazawa | G11B 5/0086 360/32 |
| 2001/0016109 A1 | * | 8/2001 | Okutani | G11B 15/1875 |
| 2007/0053661 A1 | * | 3/2007 | Nakajima | G11B 27/28 |
| 2013/0246701 A1 | * | 9/2013 | Fujihara | G06F 3/061 711/111 |
| 2014/0085746 A1 | * | 3/2014 | Fujihara | G11B 27/00 360/74.4 |
| 2015/0062733 A1 | | 3/2015 | Ashida et al. | |
| 2016/0322073 A1 | | 11/2016 | Tsukahara et al. | |

FOREIGN PATENT DOCUMENTS

| | | |
|---|---|---|
| JP | 2015-049709 A | 3/2015 |
| JP | 2016-212537 A | 12/2016 |

* cited by examiner

*Primary Examiner* — Peter Vincent Agustin
(74) *Attorney, Agent, or Firm* — Fujitsu Patent Center

(57) ABSTRACT

An information processing apparatus configured to: access blocks having a fixed size provided such that, among magnetic tapes having a redundant configuration, reverse time of one of the magnetic tapes and read time of the other magnetic tapes are identical; insert into each of the magnetic tapes a single first dummy block immediately after reversal of a first wrap; and insert one or more second dummy blocks into each of the other magnetic tapes immediately before the reversal of the first wrap such that different numbers of the one or more second dummy blocks are inserted into the different other magnetic tapes and inserting into each of the other magnetic tapes immediately after the reversal of the first wrap one or more third dummy blocks a number of which is equal to a number of the one or more second dummy blocks in each of the other magnetic tapes.

5 Claims, 19 Drawing Sheets

FIG. 1
RELATED ART

| stream | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |

FIG. 2
RELATED ART

| | stream | 0 | 1 | 2 | 3 | 4 | 5 | 6 | 7 | 8 | 9 | 10 |
|---|---|---|---|---|---|---|---|---|---|---|---|---|
| tape | | | | | | | | | | | | |
| D0 | wrap0 | 0 | 1 | 2 | 3 | 4 | 5 | 6 | 7 | 8 | 9 | 10 |
| D1 | wrap0 | 0 | 1 | 2 | 3 | 4 | 5 | 6 | 7 | 8 | 9 | 10 |

FIG. 3
RELATED ART

|  | stream | 0 | 1 | 2 | 3 | 4 | 5 | 6 | 7 | 8 | 9 | 10 |
|---|---|---|---|---|---|---|---|---|---|---|---|---|
| tape | | | | | | | | | | | | |
| D0 | wrap0 | 0 | 1 | 2 | 3 | 4 | 5 | 6 | 7 | 8 | 9 | 10 |
| D1 | wrap0 | 0 | 1 | 2 | 3 | 4 | 5 | 6 | 7 | 8 | 9 | 10 |
| P | wrap0 | 0 | 1 | 2 | 3 | 4 | 5 | 6 | 7 | 8 | 9 | 10 |

FIG. 4
RELATED ART

| tape | stream | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|---|---|
| D0 | wrap0 | BOT | | | | | | | | | | EOT | | | | | | | | | | | | | | | | | | | | | | |
| | wrap1 | 0 | 1 | 2 | 3 | 4 | 5 | 6 | 7 | 8 | 9 | 10 | | | | | | | | | | | | | | | | | | | | | | |
| | wrap2 | 21 | 20 | 19 | 18 | 17 | 16 | 15 | 14 | 13 | 12 | 11 | | | | | | | | | | | | | | | | | | | | | | |
| | wrap3 | 22 | 23 | 24 | 25 | 26 | 27 | 28 | 29 | 30 | 31 | 32 | | | | | | | | | | | | | | | | | | | | | | |
| | | 43 | 42 | 41 | 40 | 39 | 38 | 37 | 36 | 35 | 34 | 33 | | | | | | | | | | | | | | | | | | | | | | |

TAPE RUNNING DIRECTION

FIG. 7
RELATED ART

| tape | | time | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|---|---|---|
| D0 | wrap0 | | 0 | 1 | 2 | 3 | 4 | 5 | 6 | 7 | 8 | 9 | 10 | R | | | | | | | | | | | | | | | | | | | | | | |
| | wrap1 | | | | | | | | | | | | | R | 11 | 12 | 13 | 14 | 15 | 16 | 17 | 18 | 19 | | | | | | | | | | | | | |
| D1 | | | | | | | | | | | | 9 | 10 | 11 | 12 | | | | | | | | | | | | | | | | | | | | |
| P | | | | | | | | | | | | 9 | 10 | 11 | 12 | | | | | | | | | | | | | | | | | | | | |

WITHOUT SKIP, DELAY RELATIVE TO OTHER TAPES OCCURS — C1

FIG. 8
RELATED ART

| tape | stream | 0 | 1 | 2 | 3 | 4 | 5 | 6 | 7 | 8 | 9 | 10 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|---|
| D0 | wrap0 | 0 | 1 | 2 | 3 | 4 | 5 | 6 | 7 | 8 | 9 | 10 | | | | | | | | | | | | | | | | | | | | | | |
| | wrap1 | 21 | 20 | 19 | 18 | 17 | 16 | 15 | 14 | 12 | 13 | 12 | | | | | | | | | | | | | | | | | | | | | | |

C2 — DATA LOSS → X

| tape | stream | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|---|---|
| D0 | wrap0 | BOT | | | | | | | | | | EOT | | | | | | | | | | | | | | | | | | | | | | |
| | wrap1 | 0 | 1 | 2 | 3 | 4 | 5 | 6 | 7 | 8 | 9 | 10 | | | | | | | | | | | | | | | | | | | | | | |
| | wrap2 | 20 | 19 | 18 | 17 | 16 | 15 | 14 | 13 | 12 | 11 | D | | | | | | | | | | | | | | | | | | | | | | |
| | wrap3 | D | 21 | 22 | 23 | 24 | 25 | 26 | 27 | 28 | 29 | 30 | | | | | | | | | | | | | | | | | | | | | | |
| | | 40 | 39 | 38 | 37 | 36 | 35 | 34 | 33 | 32 | 31 | D | | | | | | | | | | | | | | | | | | | | | | |
| D1 | wrap0 | 0 | 1 | 2 | 3 | 4 | 5 | 6 | 7 | 8 | D | D | | | | | | | | | | | | | | | | | | | | | | |
| | wrap1 | 18 | 17 | 16 | 15 | 14 | 13 | 12 | 11 | 10 | D | | | | | | | | | | | | | | | | | | | | | | | |
| | wrap2 | D | 19 | 20 | 21 | 22 | 23 | 24 | 25 | 26 | 27 | 28 | | | | | | | | | | | | | | | | | | | | | | |
| | wrap3 | 38 | 37 | 36 | 35 | 34 | 33 | 32 | 31 | 30 | 29 | D | | | | | | | | | | | | | | | | | | | | | | |
| P | wrap0 | 0 | 1 | 2 | 3 | 4 | 5 | 6 | 7 | 8 | D | D | | | | | | | | | | | | | | | | | | | | | | |
| | wrap1 | 16 | 15 | 14 | 13 | 12 | 11 | 10 | 9 | D | D | D | | | | | | | | | | | | | | | | | | | | | | |
| | wrap2 | D | 17 | 18 | 19 | 20 | 21 | 22 | 23 | 24 | 25 | 26 | | | | | | | | | | | | | | | | | | | | | | |
| | wrap3 | 36 | 35 | 34 | 33 | 32 | 31 | 30 | 29 | 28 | 27 | D | | | | | | | | | | | | | | | | | | | | | | |

G1: INSERT ONE DUMMY INTO EACH OF TOP AND SECOND WRAPS

G2: INSERT TWO DUMMIES INTO EACH OF TOP AND SECOND WRAPS

INFORMATION PROCESSING APPARATUS AND METHOD OF PROCESSING INFORMATION

CROSS-REFERENCE TO RELATED APPLICATION

This application is based upon and claims the benefit of priority of the prior Japanese Patent Application No. 2021-63674, filed on Apr. 2, 2021, the entire contents of which are incorporated herein by reference.

FIELD

The embodiment discussed herein is related to an information processing apparatus and a method of processing information.

BACKGROUND

A tape medium in which stream data is written exists.

FIG. 1 illustrates an example of stream data.

Stream data is a data string in a fixed sequence such as a time series, and a data string of streams 0 to 32 is illustrated FIG. 1 as an example. Stream data is sequentially written to or read from a tape drive. With stream data, recording in the tape for sequential access is easy and degradation of the performance is small.

FIG. 2 is a table illustrating replication in a tape medium.

A tape medium may be made redundant to suppress losses of data caused by a medium failure. In the example illustrated in FIG. 2, replication is performed by writing streams 0 to 10 to wrap 0 of a tape D0 and wrap 0 of a tape D1. At time t, D0 (t)=D1 (t) holds, and data strings written to the tape D0 and the tape D1 are the same.

FIG. 3 is a table illustrating an erasure code (EC) in the tape medium.

In the example illustrated in FIG. 3, the EC is performed by writing streams 0 to 10 to each of wrap 0 of the tape D0 and wrap 0 of the tape D1 similarly to the case illustrated in FIG. 2 and also writing streams 0 to 10 to wrap 0 of a tape P. At the time t, P (t)=D0 (t)^D1 (t) holds. A symbol ^ represents an exclusive OR.

FIG. 4 illustrates a structure of the tape medium.

The tape medium has a plurality of wraps. In the example illustrated in FIG. 4, the tape D0 has wraps 0 to 3. In the tape medium, the running direction of the tape is reversed in adjacent wraps. In the example illustrated in FIG. 4, in wrap 0 and wrap 2, the stream data is written in a direction from begin of tape (BOT) to end of tape (EOT), and in wrap 1 and wrap 3, the stream data is written in a direction from EOT to BOT.

FIG. 5 is a graph illustrating a reading delay due to reversal of the tape running direction.

In FIG. 5, the horizontal axis represents time (s) and the vertical axis represents the amount of read data (byte). During the reversal of the tape running direction, data access is disabled, and accordingly, time becoming a read load occurs in each wrap. In the example illustrated in FIG. 5, the amount of read data does not increase in a reverse period indicated by a reference sign A1.

FIG. 6 includes graphs illustrating hiding of reverse time in the tape medium.

Delays due to the reversal may be hidden when, by using a redundant array independent disks (RAID) technique, a tape of replica and a tape of parity are simultaneously read and data to be delayed due to the reversal is reproduced from the parity.

In the example illustrated in FIG. 6, in the tape D0, an exclusive OR D1^P is used for reproduction of the data in reverse periods indicated by reference signs B11 and B12. In the tape D1, an exclusive OR D0^P is used for reproduction of the data in a reverse period indicated by a reference sign B21.

Thus, when the number of drives is k, data reading may be executed throughput (k−1) times without delay.

Examples of the related art include as follows: Japanese Laid-open Patent Publication No. 2015-049709; and Japanese Laid-open Patent Publication No. 2016-212537.

SUMMARY

According to an aspect of the embodiments, there is provided an information processing apparatus including: a memory; and a processor coupled to the memory, the processor being configured to perform processing, the processing including: accessing blocks that have a fixed size provided such that, among a plurality of magnetic tapes that have a redundant configuration, reverse time of one of the magnetic tapes and read time of the other magnetic tapes are identical; inserting into each of the plurality of magnetic tapes a single first dummy block immediately after reversal of a first wrap; and inserting one or more second dummy blocks into each of the other magnetic tapes immediately before the reversal of the first wrap such that different numbers of the one or more second dummy blocks are inserted into the different other magnetic tapes and inserting into each of the other magnetic tapes immediately after the reversal of the first wrap one or more third dummy blocks a number of which is equal to a number of the one or more second dummy blocks in each of the other magnetic tapes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of stream data;

FIG. 2 is a table illustrating replication in a tape medium;

FIG. 3 is a table illustrating an erasure code (EC) in the tape medium;

FIG. 4 illustrates a structure of the tape medium;

FIG. 7 is a Gantt chart illustrating synchronization between tapes in the reversal of a tape;

FIG. 8 is a table illustrating a data loss in the tape;

FIG. 10 is a table illustrating data read control immediately after reversal according to the embodiment;

FIG. 11 is a table illustrating insertion control for dummy data after the reversal according to the embodiment;

DESCRIPTION OF EMBODIMENTS

Figure 5:
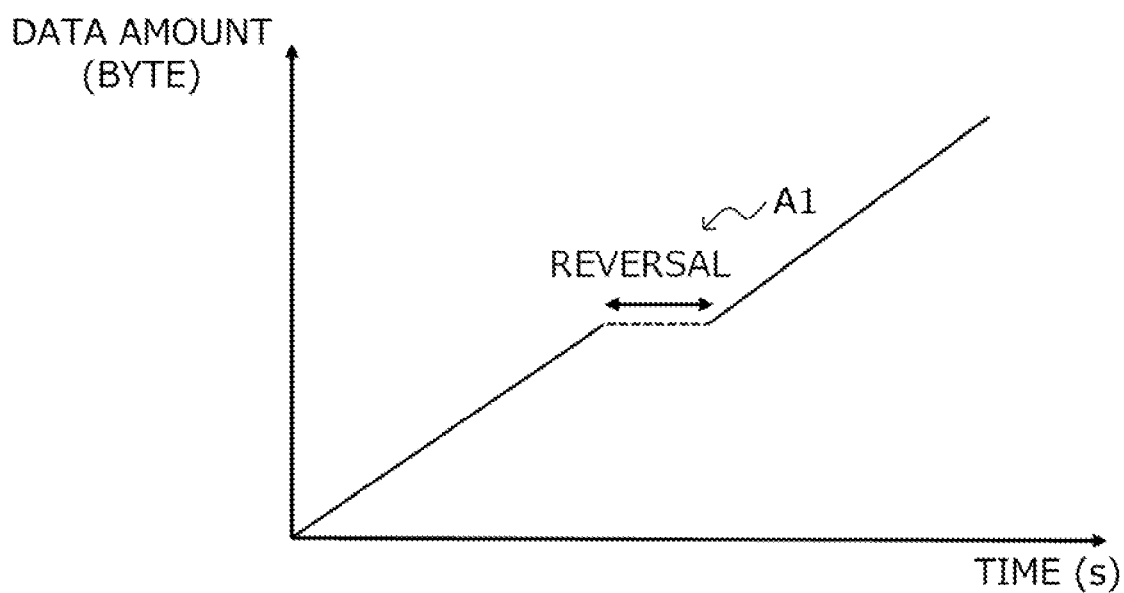
FIG. 5 is a graph illustrating a reading delay due to reversal of a tape running direction.
Figure 6:
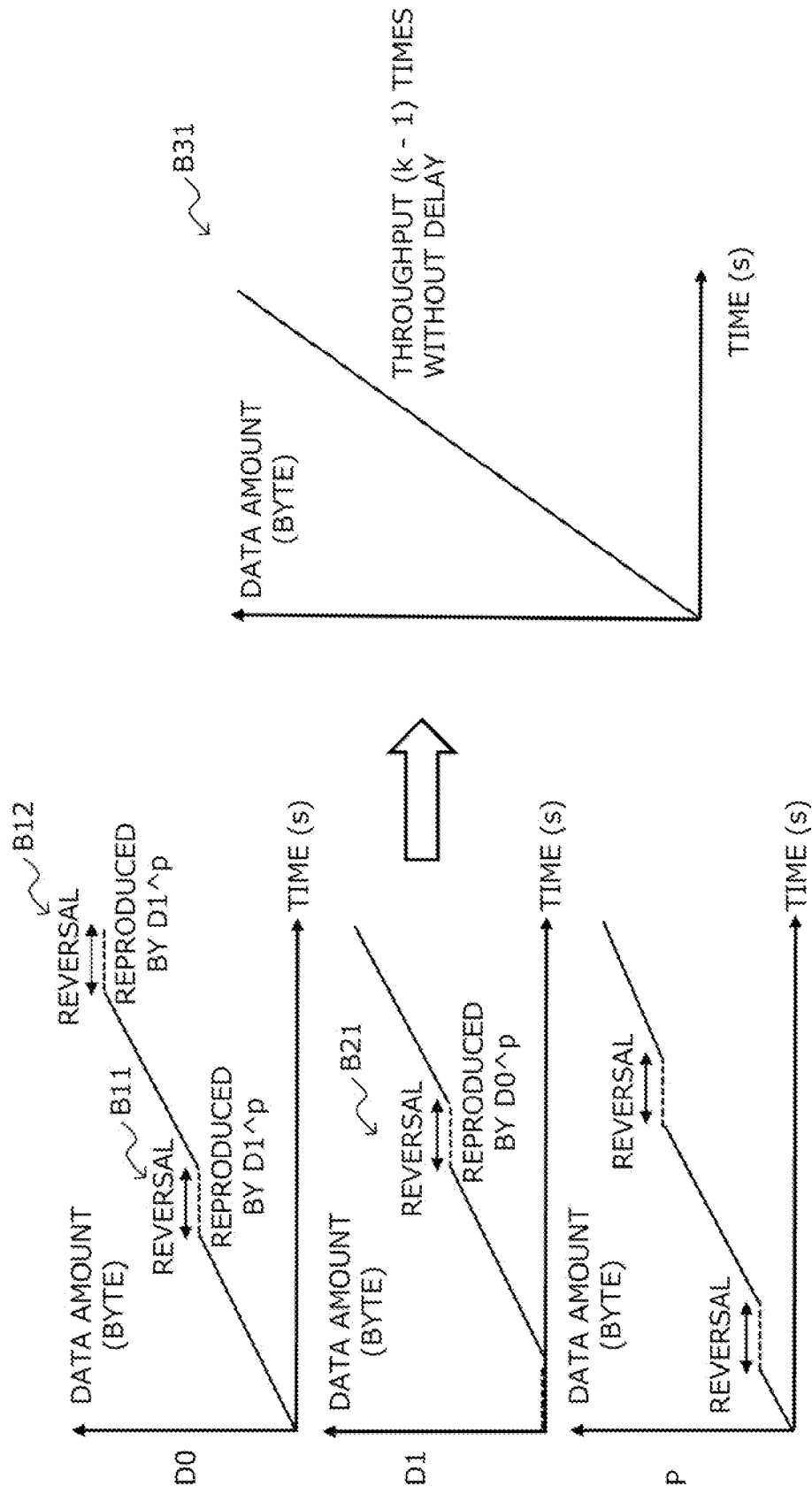
FIG. 6 includes graphs illustrating hiding of reverse time in the tape medium.

FIG. 7 is a Gantt chart illustrating synchronization between tapes in the reversal of a tape.

Running control of a tape is performed such that reverse time of a certain tape and reading time of delay data from another tape are superposed on each other. In the example illustrated in FIG. 7, at time 11, a tape D0 is reversed (R) from wrap 0 to wrap 1, and stream 11 is read from tape D1 and tape P. As indicated by a reference sign C1, at the next time 12, stream 11 is read from the tape D0 while stream 12 is read from the tape D1 and the tape P. Thus, reading of data from the reversed tape is delayed relative to the other tapes unless reading of a single stream is skipped immediately after the reversal. However, for redundancy, the entirety of the data is usually written to each of the tapes.

FIG. 8 is a table illustrating a data loss in the tape.

As illustrated in FIG. 8, in the tape D0, by writing with stream 11 omitted, the time for reading stream 12 from the tape D0 may be aligned with the time of reading stream 12 from the tape D1 and the tape P. However, this causes stream 11 to be lost in the tape D0 as indicated by a reference sign C2. Thus, when a failure occurs in the tape D1 or the tape P, a loss occurs in the data of stream 11.

One aspect of the embodiment is to suppress delays in tape reversal while data read from redundant magnetic tapes is ensured.

[A] Embodiment

An embodiment will be described below with reference to the drawings. The embodiment described below is merely exemplary and is not intended to exclude application of various modification examples or techniques that are not explicitly described in the embodiment. For example, the present embodiment may be realized by variously modifying the embodiment without departing from the gist of the embodiment. Each of the drawings is not intended to indicate that only the elements illustrated in the drawing are included. Thus, other functions or the like may be included.

Hereafter, each of the same reference signs denotes substantially the same portion in the drawings, so that the description thereof is omitted.

[A-1] Configuration Example

Figure 9:
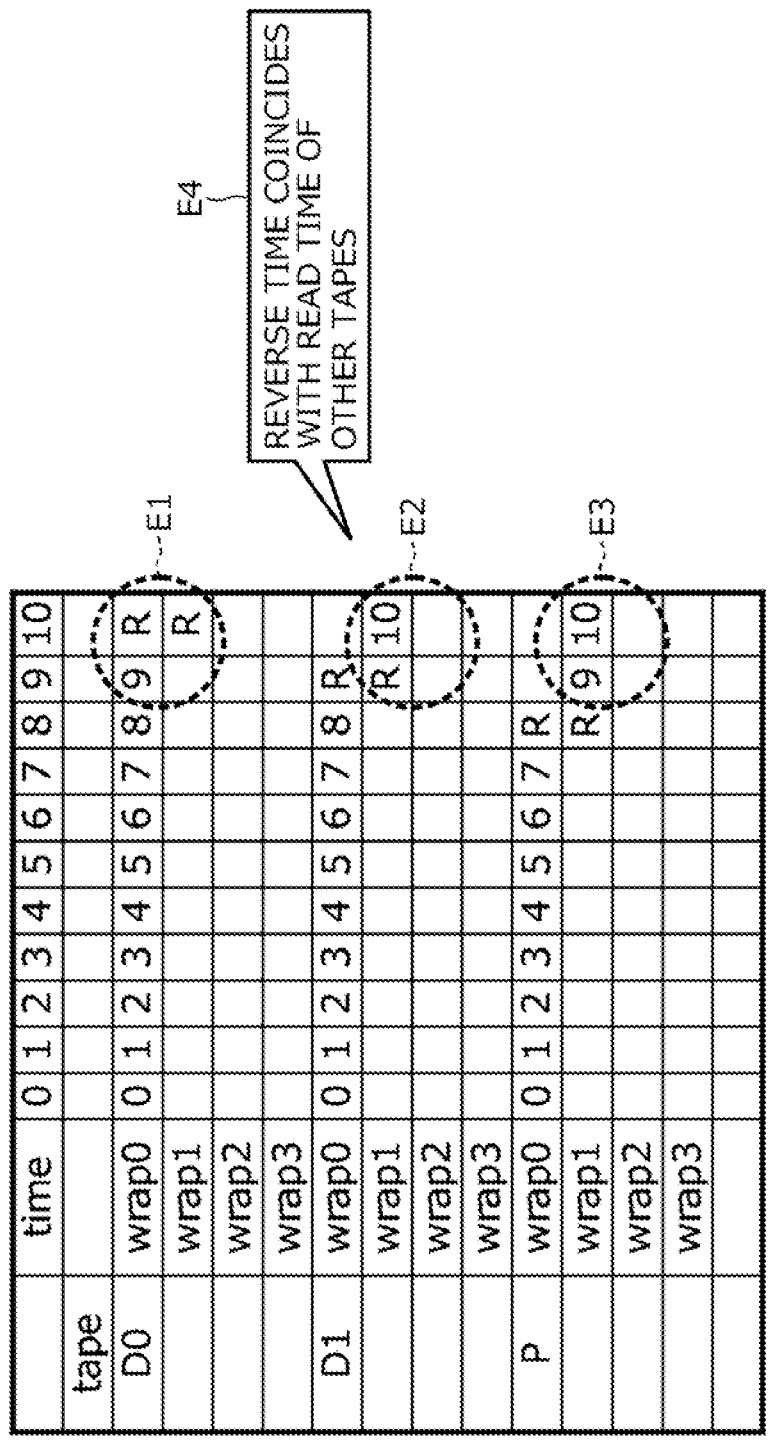
FIG. 9 is a Gantt chart illustrating the relationship between tape reverse time and data read time according to an embodiment.

FIG. 9 is a Gantt chart illustrating the relationship between tape reverse time and data read time according to the embodiment.

The tape reverse time in a certain tape and the data read time in the other tapes are set to be the same. The tapes are made accessible as fixed-length blocks, and a data size of a fixed-length block is set as reverse time×transfer rate.

In the example illustrated in FIG. 9, stream 10 is read from wrap 1 of a tape D1 and wrap 1 of a tape P as respectively indicated by reference signs E2 and E3 at reverse time from wrap 0 to wrap 1 in a tape D0 indicated by a reference sign E1 at time 10. Thus, as indicated by a reference sign E4, tape reverse time in the tape D1 coincides with the read time in the other tapes D1 and P.

Figure 10:
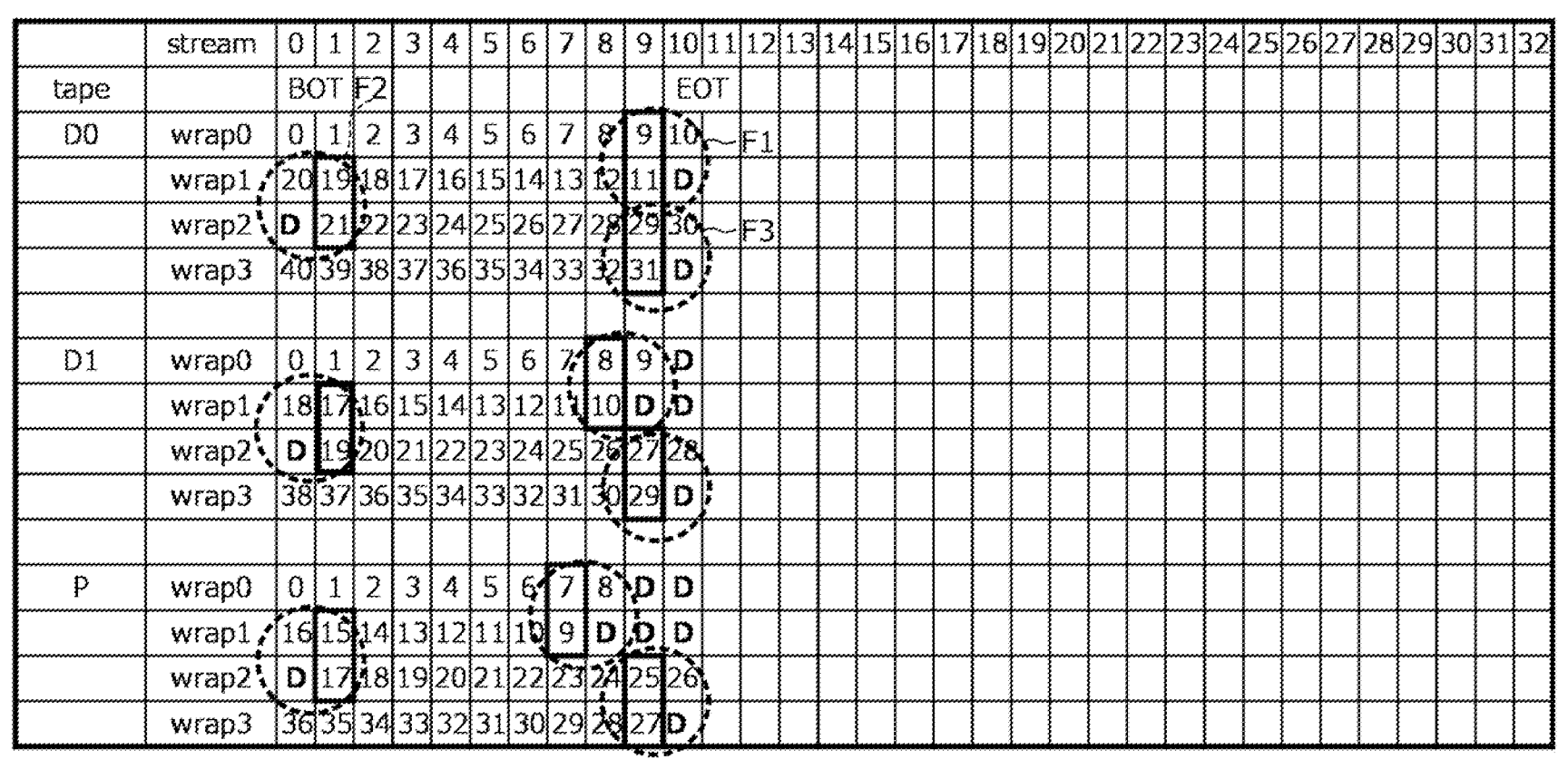

FIG. 10 is a table illustrating data read control immediately after the reversal according to the embodiment.

Reading of data immediately after tape reversal is one stream skipped. In writing, a dummy block is inserted at the top after the reversal of the wrap. When a turning position is set at a position at least one stream before data stored at the end of a wrap (end of tape (EOT) or begin of tape (BOT)) and the reversal is performed at the turning position, one stream of data may be skipped.

In the example illustrated in FIG. 10, a thick frame indicates a turning position in reading, and D indicates dummy data.

In the tape D0, when turning is performed at stream 9 of wrap 0 as indicated by a reference sign F1, next, stream 11 is able to be read in wrap 1. Also in the tape D0, when turning is performed at stream 19 of wrap 1 as indicated by a reference sign F2, next, stream 21 is able to be read in wrap 2. Also in the tape D0, when turning is performed at stream 29 of wrap 2 as indicated by a reference sign F3, next, stream 31 is able to be read in wrap 3.

Also in the tape D1 and tape P, as is the case with the tape D0, data is read with one stream skipped at the turning position.

However, as will be described later with reference to FIG. 11, the turning position varies from tape to tape due to insertion of the dummy data D.

FIG. 11 is a table illustrating insertion control for dummy data after the reversal according to the embodiment.

The reverse times of the tapes are not superposed on each other by controlling, on a tape-by-tape basis, the number of pieces of dummy data to be inserted. In writing, in addition to the insertion of one dummy block at the top after the reversal, the same number of dummy blocks are inserted before the EOT of the top wrap and after the EOT of the second wrap.

The number of dummy blocks may be changed on a tape-by-tape basis. This ensures the characteristics by which the turning positions of the tapes are not superposed on each other and skip of one piece of data in the reversal at the turning position is enabled.

In the example illustrated in FIG. 11, as indicated by a reference sign G1, one piece of dummy data D is inserted into both top wrap 0 and second wrap 1 in the tape D1 in addition to the piece of dummy data D similar to that in the tape D0. Also, as indicated by a reference sign G2, two pieces of dummy data D are inserted into both top wrap 0 and second wrap 1 in the tape P in addition to the piece of dummy data D similar to that in the tape D0. A thick frame indicates a turning position in reading.

Figure 12:
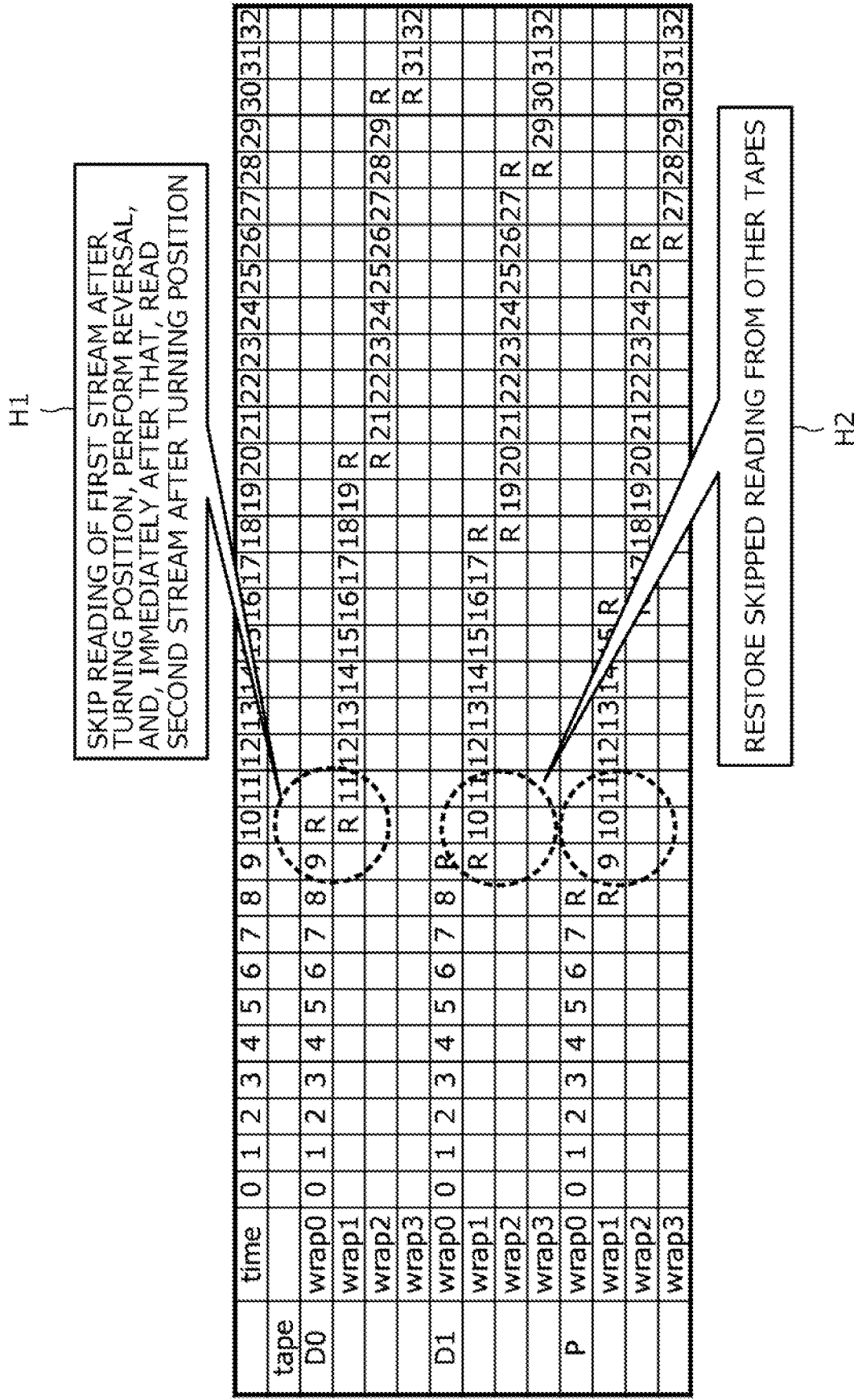
FIG. 12 is a Gantt chart illustrating a stream data read process according to the embodiment.

FIG. 12 is a Gantt chart illustrating a stream data read process according to the embodiment.

In reading stream data, tape is run such that the running of the tape is reversed at the turning position. Data reading immediately after the turning is skipped, and the data is restored by using a replica or parity.

In the example illustrated in FIG. 12, as indicated by a reference sign H1, in the tape D0, stream 11 is read immediately after stream 9 by skipping reading of a first stream after the turning position from wrap 0 to wrap 1 at time 10, performing the reversal, and, immediately after that, performing reading of a second stream after the turning position. As indicated by a reference sign H2, reading of the skipped stream 10 is restored from the other tapes D1 and P.

Figure 13:
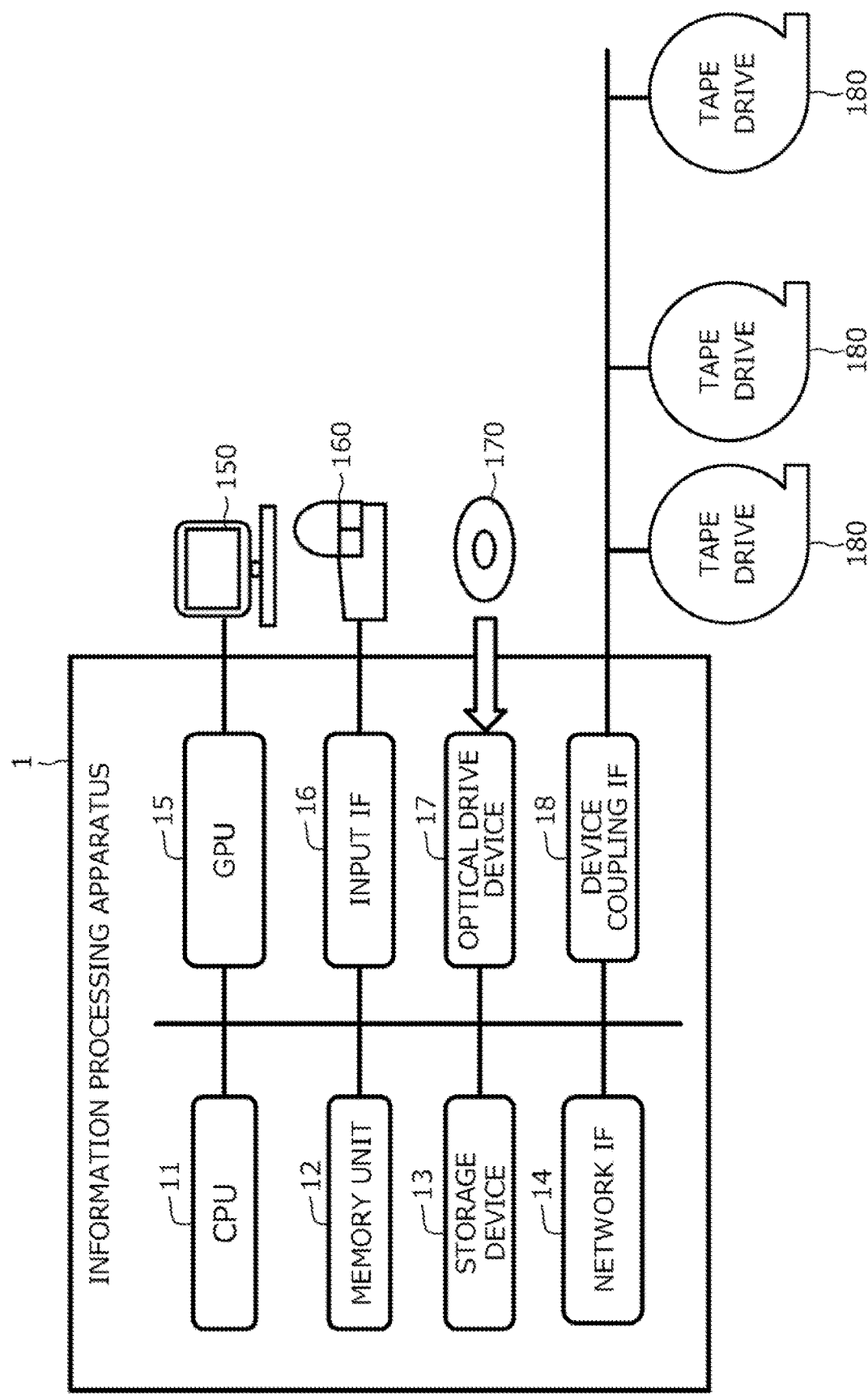
FIG. 13 is a block diagram schematically illustrating an example of a hardware configuration of an information processing apparatus according to the embodiment.

FIG. 13 is a block diagram schematically illustrating an example of a hardware configuration of an information processing apparatus 1 according to the embodiment.

The information processing apparatus 1 includes a central processing unit (CPU) 11, a memory unit 12, a storage device 13, a network Interface (IF) 14, a graphics processing unit (GPU) 15, an input IF 16, an optical drive device 17, and a device coupling IF 18. The information processing apparatus 1 may be referred to as a stream accumulation server.

The memory unit 12 is, for example, a storage device that includes a read-only memory (ROM) and a random-access memory (RAM). The RAM may be, for example, a dynamic RAM (DRAM). Programs such as a Basic Input/Output System (BIOS) may be written in the ROM of the memory unit 12. Software programs in the memory unit 12 may be appropriately loaded onto and executed by the CPU 11. The RAM of the memory unit 12 may be used as a primary recording memory or a working memory.

The storage device 13 is, for example, a device that stores data such that the data is able to be read from and written to the storage device 13. The storage device 13 may be, for example, a hard disk drive (HDD), a solid-state drive (SSD), or a storage class memory (SCM). At least part of the storage device 13 may function as a write buffer 131 and a read buffer 132 to be described later with reference to FIG. 14.

The network IF 14 causes the information processing apparatus 1 to be coupled to a network.

The GPU 15 controls output of a video to a display device 150. The function of the GPU 15 may be provided in the CPU 11, or the GPU 15 may execute part of arithmetic processing of the CPU 11. The display device 150 is a liquid crystal display, an organic light-emitting diode (OLED) display, a cathode ray tube (CRT), an electronic paper display, or the like and displays various types of information for, for example, an operator.

The input IF 16 controls input of information from the input device 160. The input device 160 includes, for example, a mouse, a trackball, and a keyboard. The operator performs various input operations by using this input device 160. The input device 160 and the display device 150 may be combined with each other. For example, a touch panel may be used.

The optical drive device 17 is configured so as to allow an optical disk 170 to be inserted into the optical drive device 17. The optical drive device 17 is configured to be able to read information recorded in an optical disk 170 in a state in which the optical disk 170 is inserted into the optical drive device 17. According to the present example, the optical disk 170 is portable. The optical disk 170 is a computer-readable recording medium, and is, for example, a flexible disk, a compact disk (CD such as a CD-ROM, a CD-recordable (CD-R), or a CD-rewritable (CD-RW)), a Digital Versatile Disk (DVD such as a DVD-ROM, a DVD-RAM, a DVD-R, a DVD+R, a DVD-RW, a DVD+RW, or a high-definition (HD) DVD), or a Blu-ray disk.

The device coupling IF 18 is configured so as to allow a plurality of coupling devices such as tape drives 180 to be attached to the device coupling IF 18. For example, a magnetic tape may be mounted on the tape drives 180. Data is redundantly stored in the magnetic tapes to be mounted on the plurality of tape drives 180 by a redundant array independent disks (RAID) technique or the like.

Figure 14:
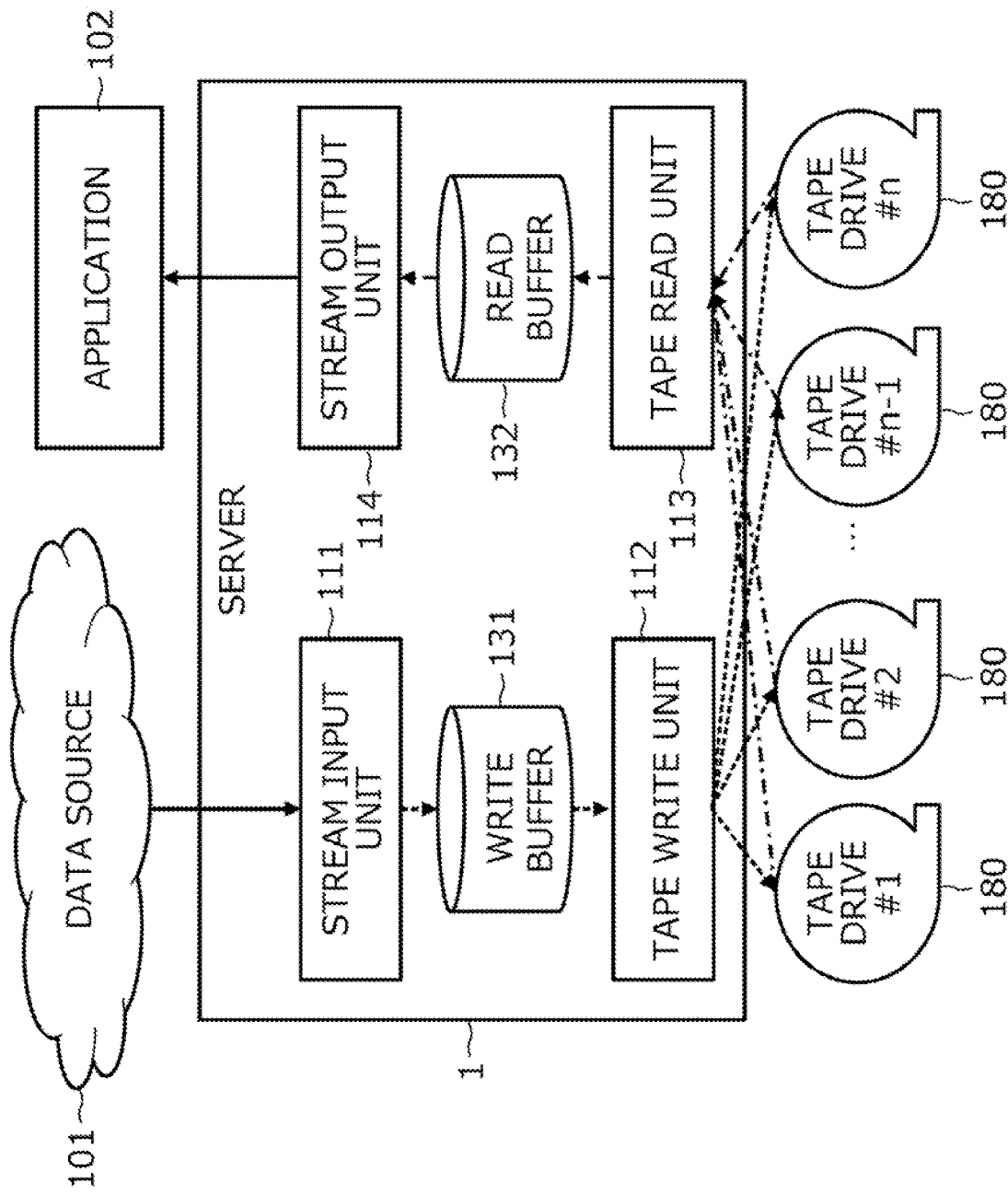
FIG. 14 is a block diagram schematically illustrating an example of a software configuration of the information processing apparatus illustrated in FIG. 13.

FIG. 14 is a block diagram schematically illustrating an example of a software configuration of the information processing apparatus 1 illustrated in FIG. 13.

The CPU 11 is a processing device that performs various types of control and arithmetic. The CPU 11 executes an operating system (OS) and the programs stored in the memory unit 12 to realize various functions. For example, as illustrated in FIG. 14, the CPU 11 functions as a stream input unit 111, a tape write unit 112, a tape read unit 113, and a stream output unit 114.

A program for realizing the functions of the stream input unit 111, the tape write unit 112, the tape read unit 113, and the stream output unit 114 is provided in a form in which, for example, the program is recorded in the optical disk 170 or the tape drives 180 described above. A computer uses the program by reading the program from the optical disk 170 or the tape drives 180 through the optical drive device 17 or the device coupling IF 18, transferring the program to an internal storage device or an external storage device, and storing the program in the internal storage device or the external storage device. For example, the program may be recorded in a storage device (on a recording medium) such as a magnetic disk, an optical disk, or a magneto-optical disk and may be provided from the storage device to the computer via a communication path.

To realize the functions of the stream input unit 111, the tape write unit 112, the tape read unit 113, and the stream output unit 114, the program stored in the internal storage device (according to the present embodiment, the memory unit 12) is executed by a microprocessor (according to the present embodiment, the CPU 11) of the computer. At this time, the program recorded in the recording medium may be read and executed by the computer.

For example, the CPU 11 controls operations of the entire information processing apparatus 1. The device that controls the operations of the entire information processing apparatus 1 is not limited to the CPU 11 and may be, for example, any one of a microprocessor unit (MPU), a digital signal processor (DSP), an application-specific integrated circuit (ASIC), a programmable logic device (PLD), and a field-programmable gate array (FPGA). The device that controls the operations of the entire information processing apparatus 1 may be a combination of two or more types of the CPU, the MPU, the DSP, the ASIC, the PLD, and the FPGA.

The stream input unit 111 accepts input from a data source 101 such as the Internet of things (IoT) and writes the data source 101 to the write buffer 131.

The tape write unit 112 writes stream data read from the write buffer 131 to magnetic tapes via the tape drives 180 as data blocks and parity blocks. Also, the tape write unit 112 detects turning positions in the magnetic tapes and inserts dummy blocks.

The tape write unit 112 accesses blocks having a fixed size provided such that, among a plurality of magnetic tapes having a redundant configuration, the reverse time of one of the magnetic tapes is the same as the read time of the other magnetic tapes. Into each of the plurality of magnetic tapes, the tape write unit 112 inserts one first dummy block immediately after the reversal of the first wrap. The tape write unit 112 inserts second dummy blocks into each of the other magnetic tapes immediately before the reversal of the first wrap such that the different numbers of the second dummy blocks are inserted into the different other magnetic tapes and inserts into each of the other magnetic tapes as many third dummy blocks as the number of the second dummy blocks immediately after the reversal of the first wrap.

Into each of the plurality of magnetic tapes, the tape write unit 112 may insert one first dummy block immediately after the reversal of the second and subsequent wraps.

The tape read unit 113 reads data blocks and parity blocks from the tape drives 180. The tape read unit 113 skips the reading of the data block at the turning position. The tape read unit 113 writes the data blocks and the parity blocks having been read to the read buffer 132.

The tape read unit 113 turns back each of the plurality of magnetic tapes one block before the data at the end point of each wrap and skips reading of the data at the end point.

The stream output unit 114 reconfigures streams from the data blocks in the read buffer 132 and outputs the streams to an application 102 or the like outside the information processing apparatus 1. In the case of a delay in the data blocks read from the tape drives 180, the stream output unit 114 reconfigures the stream data by reconfiguring the data blocks by using the parity blocks.

The stream output unit 114 restores the data having been lost due to the reversal of the wrap in the one of the magnetic tapes by using the replica data or the parity data of the other magnetic tapes.

[A-2] Operation Example

Figure 15:
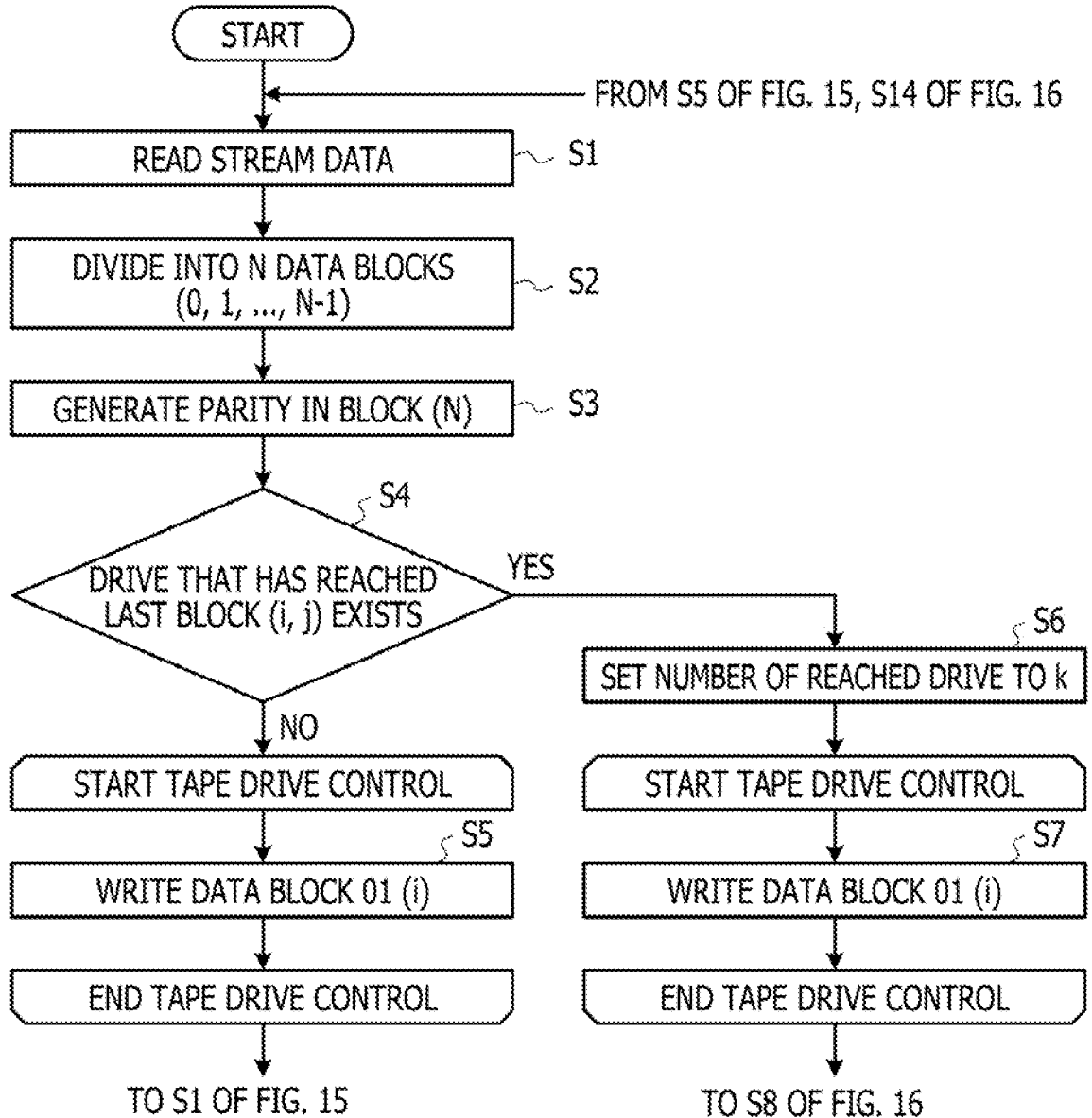
FIG. 15 is a flowchart illustrating a tape write process according to the embodiment.
Figure 16:
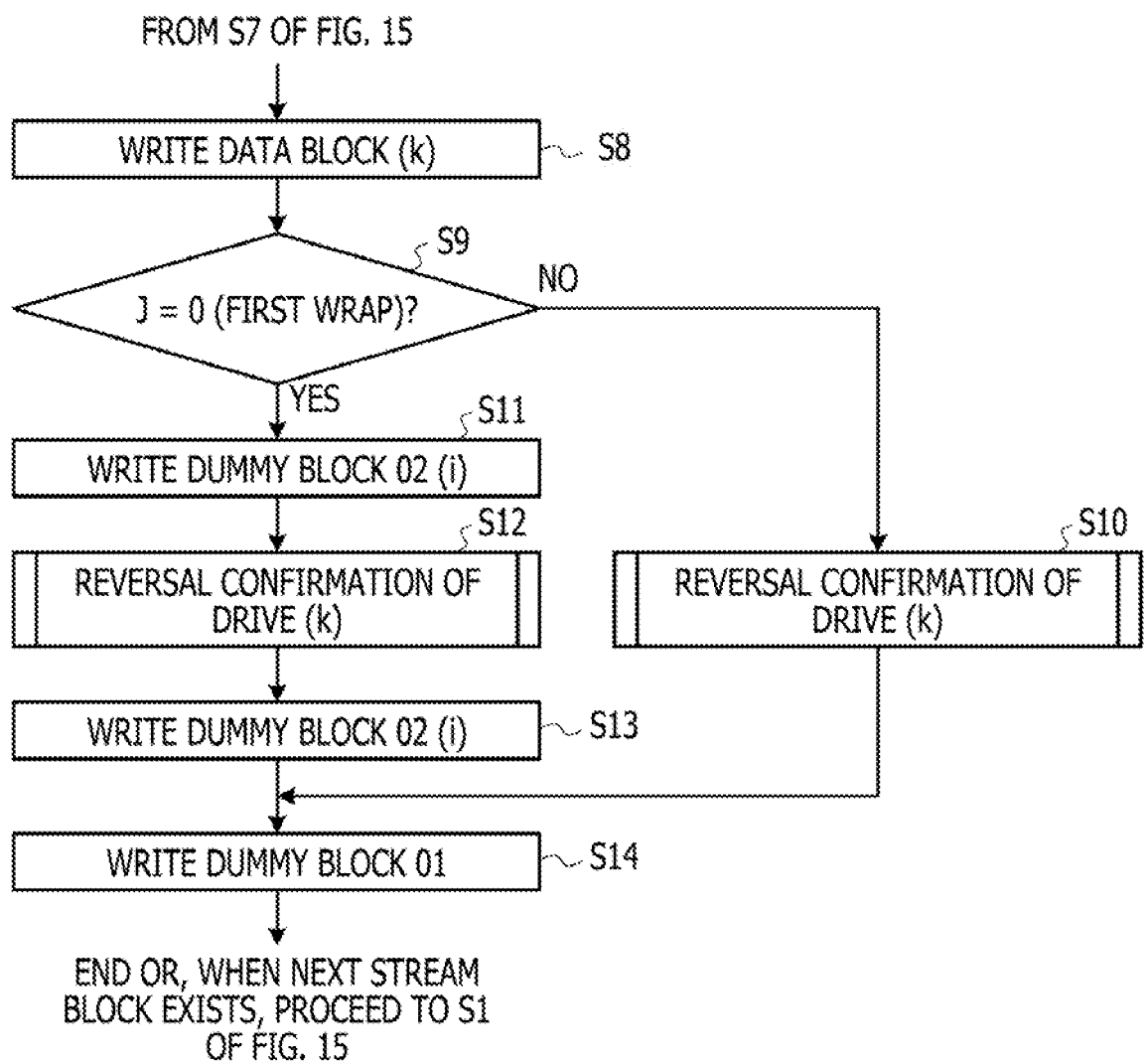
FIG. 16 is a flowchart illustrating the tape write process according to the embodiment.

A tape write process according to the embodiment will be described in accordance with a flowchart (steps S1 to S14) illustrated in FIGS. 15 and 16. FIG. 15 illustrates steps S1 to S7 and FIG. 16 illustrates steps S8 to S14.

The tape write unit 112 reads the stream data from the write buffer 131 (step S1).

The tape write unit 112 divides the stream data into N data blocks {i: 0, 1, . . . , N−1} (step S2).

The tape write unit 112 generates the parity in the block {i: N} (step S3).

Since the data block and the parity block are associated with each of the tape drives 180, the number (i) of the data block and the parity block is also the number of the tape drives 180.

The tape write unit 112 determines whether there is a tape drive 180 that has reached the last block (i, j) (step S4). The last block (i, j) represents the number of the last block in wrap (j) of the drive (i) and is skipped in the reading.

When there is no tape drive 180 that has reached the last block (i, j) (see a NO route in step S4), the tape write unit 112 starts control of the tape drives 180 and writes the data block (i) (step S5). A dummy block 01 (*i*) is a dummy block for skipping reading of the data block after the reversal.

The control of the tape drives 180 in step S5 is repeated as many times as the number of the tape drives 180 associated with the data blocks {i: 0, 1, . . . , N−1} and the parity blocks {i: N}.

Then, the process returns to step S1, and processing for the next stream block is executed.

In step S4, when there is a tape drive 180 that has reached the last block (i, j) (see a YES route in step S4), the tape write unit 112 sets the number of the tape drive 180 that has reached the last block (i, j) to k (step S6).

The tape write unit 112 starts control of the tape drives 180 and writes the data block 01 (*i*) (step S7).

Control of the tape drives 180 in step S7 is repeated as many times as the number of tape drives 180 except for the number-k tape drive 180.

Then, the process proceeds to step S8 illustrated in FIG. 16, and processing for the data block (k) is executed.

The tape write unit 112 writes the data block (k) (step S8).

The tape write unit 112 determines whether j=0 and the wrap is the first wrap (step S9).

When j=0 is not satisfied and the wrap is not the first wrap (see a NO route in step S9), the tape write unit 112 performs reversal confirmation of the tape drive 180 with the number k (step S10). The details of the process of the reversal confirmation of the tape drive 180 will be described later with reference to FIG. 17. Then, the process proceeds to step S14.

In contrast, when j=0 and the wrap is the first wrap (see a YES route in step S9), the tape write unit 112 writes a dummy block 02 (*i*) (step S11). The dummy block 02 (*i*) is a dummy block for changing the reverse time from drive to drive.

The tape write unit 112 performs the reversal confirmation of the tape drive 180 with the number k (step S12). The details of the process of the reversal confirmation of the tape drive 180 will be described later with reference to FIG. 17.

The tape write unit 112 writes the dummy block 02 (*i*) (step S13).

The tape write unit 112 writes the data block 01 (step S14).

Then, when a next stream block exists, the process returns to step S1 illustrated in FIG. 15. When no next stream block exists, the tape write process ends.

Figure 17:
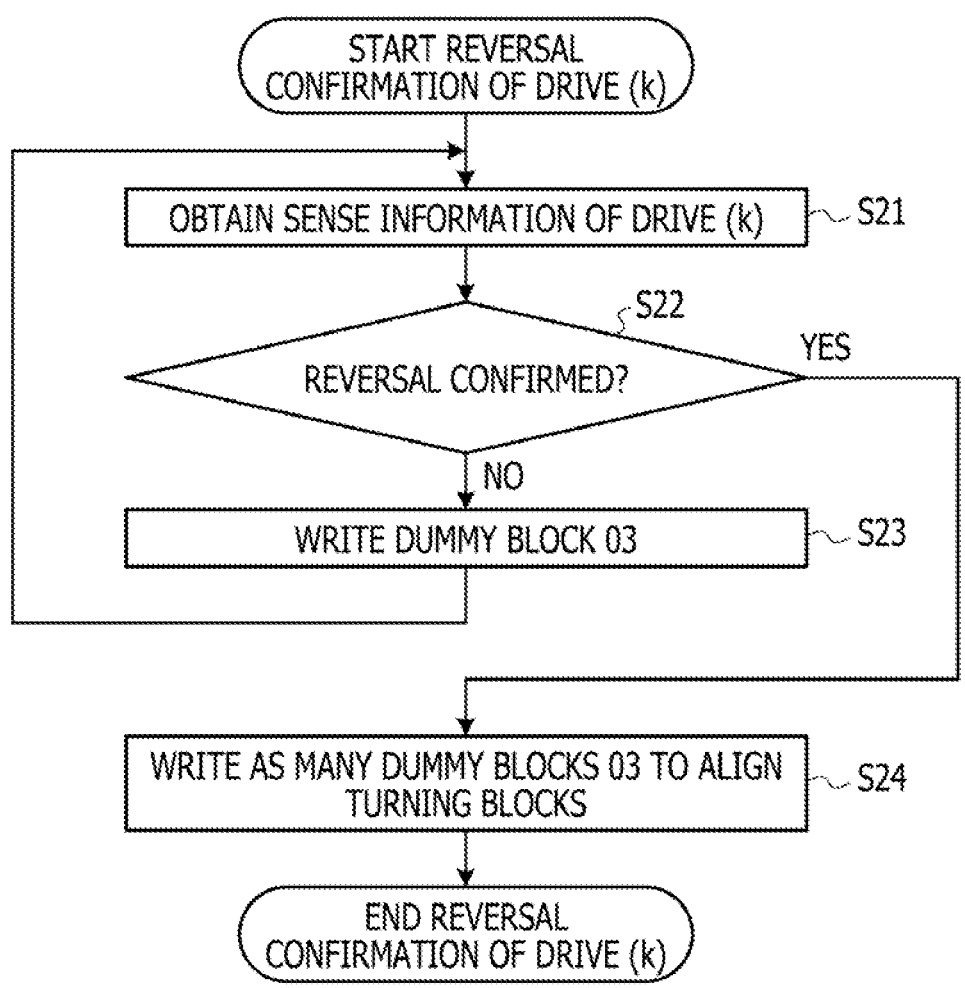
FIG. 17 is a flowchart illustrating a drive reversal confirmation process according to the embodiment.

Next, a drive reversal confirmation process according to the embodiment will be described in accordance with a flowchart (steps S21 to S24) illustrated in FIG. 17.

The tape write unit 112 obtains sense information of the tape drive 180 with the number k (step S21).

The tape write unit 112 performs the reversal confirmation of the magnetic tape based on the obtained sense information (step S22).

When the reversal of the magnetic tape is not confirmed (a NO route in step S22), the tape write unit 112 writes a dummy block 03 (step S23). The dummy block 03 is a dummy block to be written for the confirmation of the reversal of the tape drive 180. Then, the process returns to step S21.

In contrast, when the reversal of the magnetic tape is confirmed (see a YES route in step S22), the tape write unit 112 writes as many dummy blocks 03 as the number of dummy blocks 03 written in step S23 so as to align turning blocks (step S24). Thus, the drive reversal confirmation process ends.

Figure 18:
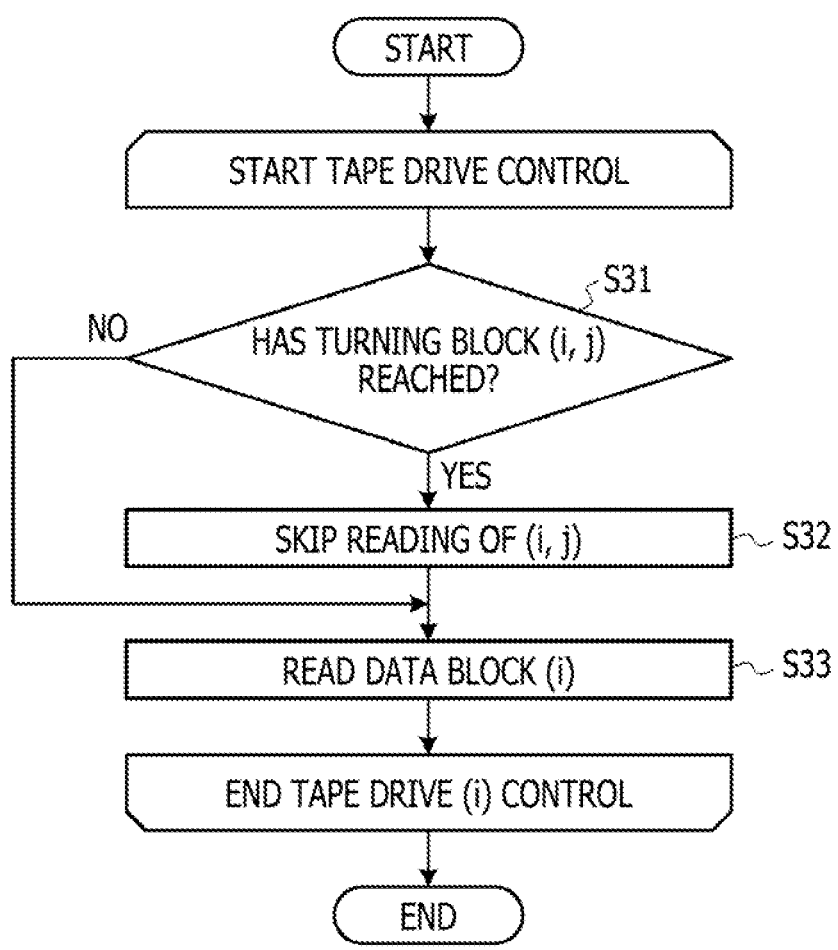
FIG. 18 is a flowchart illustrating a tape read process according to the embodiment.

Next, a tape read process according to the embodiment will be described in accordance with a flowchart (steps S31 to S33) illustrated in FIG. 18.

The tape read unit 113 starts control of the tape drives 180 and determines whether a turning block (i, j) has been reached (step S31).

When the turning block (i, j) has not been reached (see a NO route in step S31), the process proceeds to step S33.

In contrast, when the turning block (i, j) has been reached (see a YES route in step S31), the tape read unit 113 skips reading of the turning block (i, j) (step S32).

The tape read unit 113 reads the data block (i) (step S33).

The control of the tape drives 180 in steps S31 to S33 is repeated as many times as the number of the tape drives 180 corresponding to the data blocks {i: 0, 1, . . . , N−1} and the parity blocks {i: N}.

Then, the tape read process ends.

Figure 19:
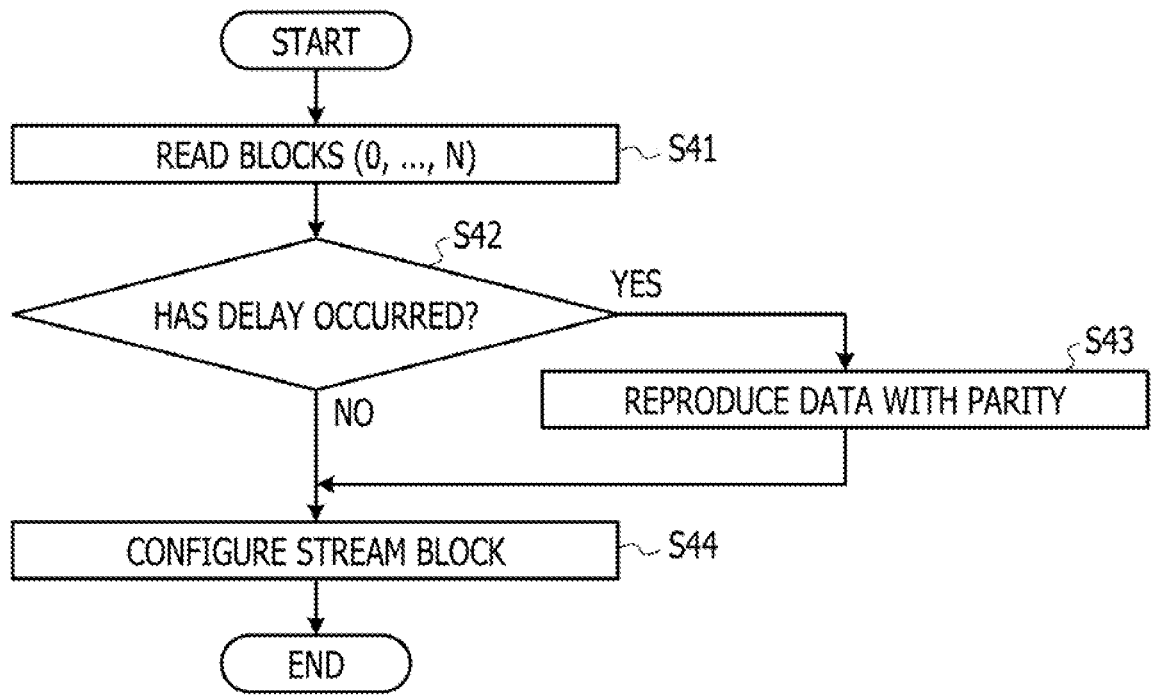
FIG. 19 is a flowchart illustrating a stream output process according to the embodiment.

Next, a stream output process according to the embodiment will be described in accordance with a flowchart (steps S41 to S44) illustrated in FIG. 19.

The stream output unit 114 reads blocks (0, . . . , N) (step S41).

The stream output unit 114 determines whether a delay occurs in reading of the tapes from the tape drives 180 (step S42).

When no delay has occurred (see a NO route in step S42), the process proceeds to step S44.

In contrast, when a delay has occurred (see a YES route in step S42), the stream output unit 114 reproduces the data with the parity (step S43).

The stream output unit 114 configures the stream block (step S44). Then, the storage output process ends. When there is a stream block to be output next, the process returns to step S41.

[B] Effects

With the information processing apparatus 1 and a method of processing information in the above-described example of the embodiment, for example, the following effects may be obtained.

The tape write unit 112 accesses blocks having a fixed size provided such that, among a plurality of magnetic tapes having a redundant configuration, reverse time of one of the magnetic tapes is the same as read time of the other magnetic tapes. Into each of the plurality of magnetic tapes, the tape write unit 112 inserts one first dummy block immediately after reversal of a first wrap. The tape write unit 112 inserts second dummy blocks into each of the other magnetic tapes immediately before the reversal of the first wrap such that the different numbers of the second dummy blocks are inserted into the different other magnetic tapes and inserts into each of the other magnetic tapes as many third dummy blocks as the number of the second dummy blocks immediately after the reversal of the first wrap.

Thus, delays in the tape reversal may be suppressed while data read from the redundant magnetic tapes is ensured. For example, in reading the streams from the magnetic tapes, delays caused by the reversal may be hidden.

Into each of the plurality of magnetic tapes, the tape write unit 112 inserts one first dummy block immediately after the reversal of the second and subsequent wraps. Thus, delays in the tape reversal may be suppressed while read data is ensured also after timing at which the second wrap is reversed.

The tape read unit 113 turns back each of the plurality of magnetic tapes one block before data at the end point of each wrap and skips reading of the data at the end point. Thus, stream data may be read in correct order without delay.

The stream output unit 114 restores data having been lost due to the reversal of the wrap in the one of the magnetic tapes by using replica data or parity data of the other magnetic tapes. Thus, the stream data may be read in correct order without delay.

[C] Others

The disclosed technique is not limited to the above-described embodiment. The disclosed technique may be carried out by variously modifying the technique without departing from the gist of the present embodiment. Each of the configurations and each of the processes of the present embodiment may be selectively employed or omitted as desired or may be combined with each other as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory, the processor being configured to perform processing, the processing including:
   accessing blocks that have a fixed size provided such that, among a plurality of magnetic tapes that have a redundant configuration, reverse time of one of the magnetic tapes and read time of the other magnetic tapes are identical;
   inserting into each of the plurality of magnetic tapes a single first dummy block immediately after reversal of a first wrap; and
   inserting one or more second dummy blocks into each of the other magnetic tapes immediately before the reversal of the first wrap such that different numbers of the one or more second dummy blocks are inserted into the different other magnetic tapes and inserting into each of the other magnetic tapes immediately after the reversal of the first wrap one or more third dummy blocks a number of which is equal to a number of the one or more second dummy blocks in each of the other magnetic tapes.

2. The information processing apparatus according to claim 1, wherein
   the processor inserts one of the first dummy block into each of the plurality of magnetic tapes immediately after reversal of second and subsequent wraps.

3. The information processing apparatus according to claim 1, wherein
   the processor turns back each of the plurality of magnetic tapes at a block one block before data at an end point of each wrap to skip reading of the data at the end point.

4. The information processing apparatus according to claim 1, wherein
   the processor restores data that has been lost due to the reversal of the wrap in the one of the magnetic tapes by using replica data or parity data of the other magnetic tapes.

5. A computer-implemented method of processing information, the method comprising:
   accessing blocks that have a fixed size provided such that, among a plurality of magnetic tapes that have a redundant configuration, reverse time of one of the magnetic tapes and read time of the other magnetic tapes are identical;
   inserting into each of the plurality of magnetic tapes a single first dummy block immediately after reversal of a first wrap; and
   inserting one or more second dummy blocks into each of the other magnetic tapes immediately before the reversal of the first wrap such that different numbers of the one or more second dummy blocks are inserted into the different other magnetic tapes and inserting into each of the other magnetic tapes immediately after the reversal of the first wrap one or more third dummy blocks a number of which is equal to a number of the one or more second dummy blocks in each of the other magnetic tapes.

* * * * *